1,901,833

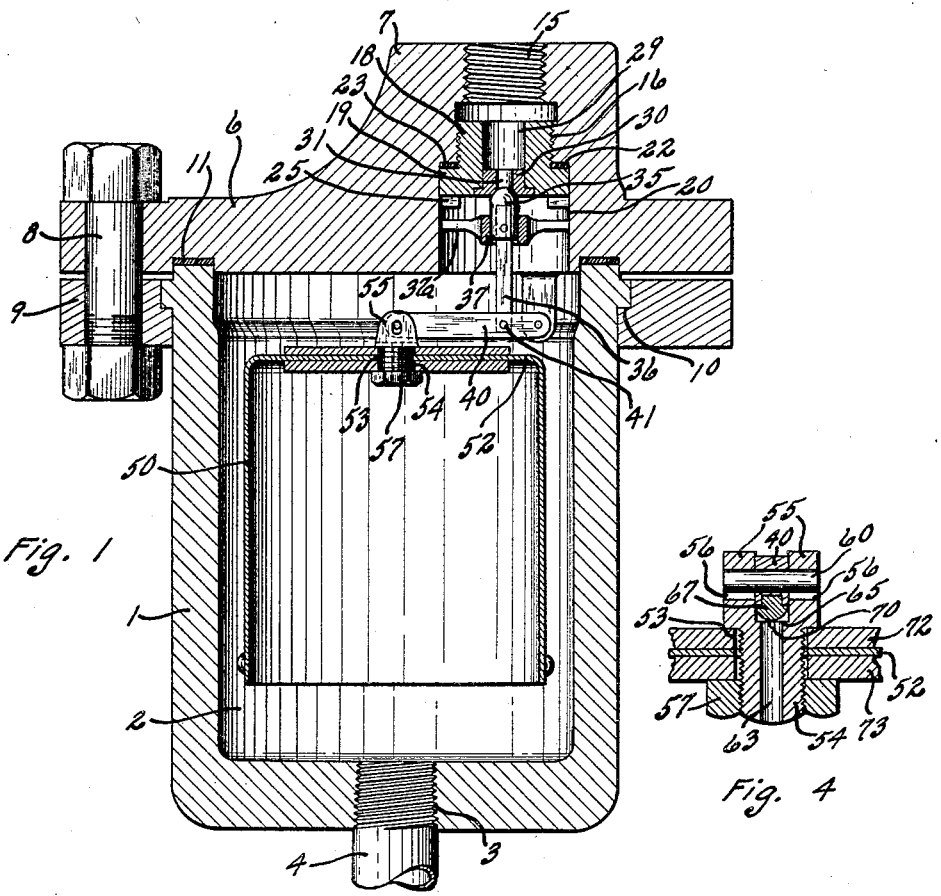
Fig. 1
Fig. 4
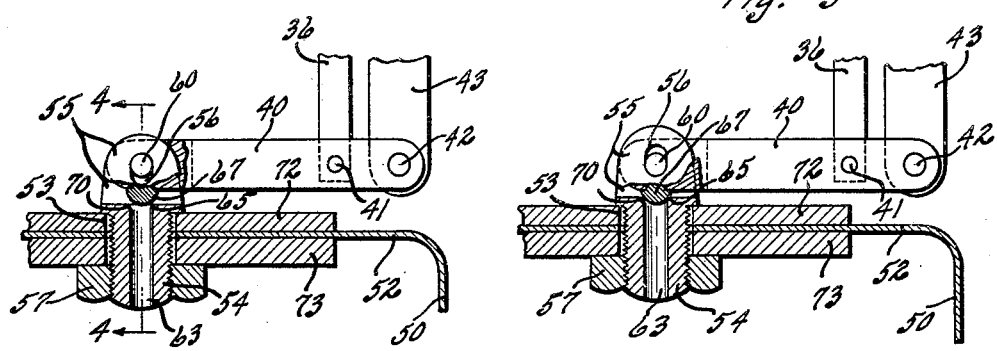
Fig. 2
Fig. 3
INVENTOR
Leslie P. Strong
BY
Brockett, Hyde, Higley & Meyer
ATTORNEYS Patented Mar. 14, 1933

UNITED STATES PATENT OFFICE

LESLIE P. STRONG, OF CLEVELAND, OHIO, ASSIGNOR TO THE CLARK MANUFACTURING COMPANY, OF CLEVELAND, OHIO, A CORPORATION OF OHIO

STEAM TRAP

Application filed July 28, 1931. Serial No. 553,503.

This invention relates to improvements in inverted bucket steam traps, such as are used with steam containing appliances for removing therefrom air and water of condensation. More particularly, the present invention relates to improvements in the vent means of the inverted buckets of such traps.

In present-day steam traps, it is the practice to provide the inverted trap bucket and more particularly, its top wall, with a small vent orifice, upwardly through which passes into the top portion of trap chamber any air which may be within the trap bucket. Some of the steam within the trap bucket also passes out through this vent orifice, but the chief function of said orifice is to permit the escape from the trap bucket of the air therein.

Inasmuch as the inverted trap bucket is buoyed up or maintained in an elevated position by the pressure of the air and/or steam within said bucket, it follows that escape of air (and, of course, steam) from said bucket through its vent orifice effects a reduction in the buoyant effect upon said bucket. Reduction of this buoyant effect upon the bucket in time causes said bucket to fall, with consequent opening of the trap outlet valve which is actuated by the rise and fall of said bucket. Due to the fact that the vent orifice of the bucket is quite small and hence the rate of escape of air and steam therethrough very low, said bucket does not fall very far until the buoyant effect thereon is increased sufficient to return said bucket to its fully elevated position, said increase being effected by the steam and/or air remaining within the trap bucket, aided by steam and/or air which may just have entered the trap chamber and hence the trap bucket.

The result is that the trap bucket is always more or less in a balanced condition, that is, the weight of said bucket is normally opposed by sufficient steam and/or air pressure to maintain said bucket in an elevated position. The bucket frequently falls, but the fall is of slight extent and the bucket is almost immediately returned to its fully elevated position, with consequent complete closing of the trap outlet. The trap outlet is therefore frequently opened, but the opening of said outlet is of slight extent and of short duration, so that little water and/or air are permitted to be discharged at any one time.

These traps may, therefore, be said to be "continuously operating" traps, for they are almost continuously discharging some water and/or air. Such more or less continuous operation is necessary if the steam containing appliance to which the trap is connected is to be substantially completely freed of its water and/or air, since the trap discharges at any one time a comparatively small amount of water and/or air.

It is the general object of the present invention to provide an improved steam trap so constructed and having such an operation that its outlet is periodically opened, to such an extent and for such a prolonged duration, that substantially all of the water and/or air in the trap can be discharged therefrom. With such a complete discharge upon each opening of the trap outlet, it is obvious that said outlet need be opened only periodically. The present improved trap is, therefore, an "intermittently operating" trap.

More specifically, the object of the present invention is the provision of a steam trap having its inverted bucket provided with improved vent means for controlling the escape from the trap bucket of air and steam therein. Said improved bucket vent means comprises a simple vent passageway in the top wall of said bucket and a simple valve cooperating with a valve seat at the upper end of said passageway, said valve being carried by the operating means for the trap outlet valve, said operating means having a lost motion connection with the trap bucket.

In order to provide the trap bucket at all times with a small vent, the valve seat at the upper end of the bucket vent passageway is provided with a small leak groove, upwardly through which slowly escapes air and some steam from within the trap bucket. Due to the lost motion connection between the trap bucket and the trap outlet valve operating means, the bucket vent passageway is only closed by its valve when the bucket is in fully elevated position. Inasmuch as said bucket is elevated by the pressure of the air and steam therein, and inasmuch as some of the air and some of the steam within the trap bucket is constantly escaping therefrom through the small leak portion which is always open, the air and/or steam pressure within the trap bucket is constantly being reduced. In time, this air and/or steam pressure is reduced to such an extent that it is insufficient to maintain the bucket in elevated position, in which position the bucket vent passageway is substantially closed by its valve. Said bucket thereupon falls, with consequent complete uncovering or opening of the bucket vent passageway. The air within the bucket, and some steam therein, immediately rush out of the trap bucket through its now completely open vent passageway, with the result that almost immediately there is insufficient air and/or steam pressure within the bucket to maintain said bucket in an elevated position. Said bucket thereupon falls to its maximum extent with consequent full opening of the trap outlet and a substantially complete evacuation of the water and air within the trap.

After such more or less complete evacuation of the water and/or air within the trap, the incoming steam elevates the bucket and thus brings about an almost complete covering or closing of the bucket vent passageway. Since the trap is more or less completely evacuated of its water and/or air, each time the trap bucket falls, it follows that said bucket does not and need not fall frequently, so that intermediate trap operation results.

The present invention will be more readily understood, and further features thereof will be apparent, from the following description of one embodiment of the invention, reference being had to the accompanying drawing in which Fig. 1 is a vertical sectional view of the present improved steam trap; Fig. 2 is an enlarged vertical sectional view of the improved bucket vent means, said vent means being fully open; Fig. 3 is a view similar to Fig. 2 but with the bucket vent means almost completely closed; and Fig. 4 is a detail vertical cross-sectional view on the line 4—4, Fig. 2.

The steam trap here illustrated includes a generally cup-shaped metal casing 1, open at its top and having a generally cylindrical chamber 2 into which steam, water of condensation and air enter through the centrally disposed bottom inlet opening 3. Threaded or otherwise suitably secured in said inlet opening is an inlet pipe 4 connected to or having communication with the steam containing appliance from which the present trap is intended to remove air and water of condensation.

The chamber 2 of the trap casing is closed at the top by a metal cover 6 of generally circular shape in plan view and provided with a slightly off-center, generally cylindrical upright extension 7, preferably integral with the cover. The marginal portion of said cover is bolted or otherwise suitably connected, as at 8, to a horizontally disposed annular metal flange 9 shrunk upon or otherwise suitably secured to the top of the trap casing 1, said casing at its top and said flange having annular interlocking shoulders 10. For sealing purposes, an annular gasket 11 is preferably interposed between the cover 6 and the top of the trap casing.

The cover 6 and the cover extension 7 are together provided with a vertically disposed through passageway, the upper and smallest portion 15 of which is threaded to receive the trap discharge or outlet pipe (not shown). The intermediate portion 16 of said passageway is also threaded and has secured therein the upper end portion 18 of a hard metal bushing, the lower enlarged end portion 19 of which lies within the lower, enlarged and unthreaded portion 20 of said cover and cover extension passageway. Said bushing is screwed up into said passageway until the upper annular surface of its lower enlarged end portion 19 engages the annular shoulder 22 formed by the enlargement of said cover and cover extension passageway. If desired, an annular sealing gasket 23 may be interposed between said cover shoulder 22 and the enlarged lower end portion 19 of said bushing, all as clearly shown in Fig. 1. For imparting rotary movement to said bushing in said cover and cover extension passageway, the lower enlarged end portion 19 of said bushing is provided with lugs 25 depending from the bottom thereof.

Shrunk into or otherwise suitably secured in the lower end of a vertically disposed passageway 29 in said bushing is an exceptionally hard metal valve seat member 30 having a generally disposed, vertically extending opening 31 therethrough. This opening 31 constitutes the outlet opening of the trap and through which opening pass, therefore, the water and air discharged from the trap.

This trap outlet opening 31 is controlled by a suitable valve 35 pinned or otherwise suitably mounted upon the upper end of a generally vertically disposed valve stem 36. For guiding said valve in its vertical movement within the lower, unthreaded portion 20 of the cover and cover extension passageway, into and out of engagement with the valve seat member 30, suitable guide means is provided in said portion 20, said means having a central portion 37 through an opening in which said valve slides and also having radially extending arm portions 37a.

For operating the trap outlet valve 35, a generally horizontally disposed lever 40 is pinned at 41 or otherwise suitably connected intermediate its ends to the lower end of the valve stem 36. The outer end of said lever is pivotally mounted at 42 to a casing lug 43 arranged within the trap chamber 2 at the top thereof, while the inner end of said lever, which end terminates substantially at the central axis of the trap, has suitable lost motion connection with an inverted bucket 50, the movement of which bucket in the trap chamber 2 controls the movement of the trap outlet valve 35 and hence the opening and closing of the trap outlet opening 31.

In the specific embodiment of the invention here shown, the trap bucket 50 is provided in its top wall 52, at substantially the center thereof, with a suitable opening 53 through which extends the threaded shank or body portion 54 of a suitable connecting member. Said connecting member has an enlarged bifurcated upper end, the two arms 55 of which are each provided with a vertically disposed slot 56. For securing said connecting member within the bucket opening 53, a nut 57 is threaded onto the lower end of the shank or body portion 54 of said connecting member, as clearly shown in the drawing. A pin 60 is arranged within the slots 56 of the arms 55 of the bucket connecting member and to this pin is suitably connected the inner end of the operating lever 40 for the trap outlet valve 35, said lever inner end lying between said connecting member arms 55, as clearly shown in Fig. 4.

The shank or body portion 54 of the bucket connecting member is provided with a vertically disposed through passageway 63, which passageway constitutes the vent opening of the trap bucket, and surrounding the upper end of said vent passageway is an annular valve seat 65 with which cooperates a valve 67, of generally ball-like form and rigidly connected to the inner end of the operating lever 40 for the trap outlet valve 35.

Due to the fact that said operating lever 40 is connected to the connecting member of the trap bucket by a pin and slot connection, the valve 67 only engages its seat 65 at the top of the bucket vent passageway 63 when said bucket is in its fully elevated position, as in Figs. 1 and 3. In order to provide the trap bucket 50 with a small vent at all times, a small leak groove 70 is provided in the valve seat 65 at the upper end of the bucket vent passageway, said leak groove being best shown in Fig. 4.

In the embodiment of the invention here shown, the trap bucket 50 has its top wall 52 reinforced by two metal discs, there being an upper disc 72 clamped between the upper surface of the bucket top wall and the enlarged bifurcated upper end of the bucket connecting member and a lower disc 73 clamped between the lower surface of the bucket top wall and the nut 57 on the lower end of the shank or body portion 54 of said bucket connecting member. Said discs not only insure a better connection between the bucket and its connecting member, but also give the bucket a greater weight at minimum expense.

So long as there is sufficient steam and/or air pressure within the trap bucket to maintain said bucket in fully elevated position, as shown in Figs. 1 and 3, the bucket vent passageway 63 will be almost completely closed by the valve 67 carried by the operating lever 40. Due to the escape, even though at a slow rate, of air (and some steam) from within the trap bucket through the leak groove 70, and due to the condensation of steam within the trap bucket, the pressure of the steam and/or air within the trap bucket is constantly being reduced. In time, the pressure of said steam and/or air is reduced to such an extent that it is no longer sufficient to maintain the trap bucket in elevated position. As the result of such reduction in pressure, the trap bucket falls, with consequent separation of the bucket valve seat 65 and the valve 67 cooperating therewith. The air and some of the steam within the trap bucket immediately rush upwardly and escape from the trap bucket through the now fully open bucket vent passageway 63, and such escape of air and steam is so rapid that said bucket continues to fall to its lowermost position, with consequent complete opening of the trap outlet opening 31 and hence complete discharge from the trap chamber 2 of the water and air therein. Inasmuch as the trap outlet opening is completely opened each time the trap bucket falls, and for an appreciable period, since the trap bucket falls each time its maximum extent, a substantially complete evacuation of the water and air within the trap is effected upon each fall of the bucket. The trap bucket, therefore, need not and does not fall frequently, so that the present trap is what may be termed an "intermittently operating" trap.

After each such evacuation of the trap, the incoming steam entering the trap chamber 2 through the inlet pipe 4 again returns the trap bucket to its fully elevated position, Figs. 1 and 3, with consequent almost complete closing of the bucket vent passageway 63 by the valve 67 and with consequent complete closing of the trap outlet opening 31 by the trap outlet valve 35. In this elevated position, the trap bucket remains until sufficient air and/or steam has escaped from the trap bucket through the leak groove 70, and/or until sufficient steam within the trap bucket has condensed, to so reduce the steam and/or air pressure within the trap bucket that said pressure is no longer sufficient to maintain the bucket elevated. The reduction to such an extent of the steam and/or air pressure within the trap bucket results in the falling of the trap bucket, with consequent complete opening of the bucket vent passageway 63 and with consequent complete opening of the trap outlet 31, all as before described.

What I claim is:

1. A steam trap, comprising a chambered casing having an inlet and an outlet, a valve for controlling said outlet, an inverted bucket in the chamber of said casing, operating means for said valve connected thereto and also having a lost motion connection with said bucket, said bucket being provided with a vent opening, and valve means carried by said operating means for controlling said bucket vent opening.

2. A steam trap as set forth in claim 1, characterized in that the bucket vent opening is adjacent the point of connection of said valve operating means with said bucket.

3. A steam trap as set forth in claim 1, characterized in that said valve means is rigidly carried by said valve operating means.

4. A steam trap as set forth in claim 1, characterized in that said valve operating means is connected to said bucket by a pin and slot connection.

5. A steam trap as set forth in claim 1, characterized in that the vent means of said bucket is in the top wall thereof.

6. A steam trap as set forth in claim 1, characterized in that said bucket is provided with a connecting member to which is connected said valve operating means, said connecting member being provided with a passageway therethrough which constitutes the vent opening of said bucket.

7. A steam trap as set forth in claim 1, characterized in that said bucket is provided with a connecting member having a body portion and a bifurcated upper end portion, said body portion being provided with a passageway therethrough which constitutes the vent opening of the bucket, and characterized further in that said valve operating means has a portion lying between and connected to the two arms of said bifurcated end portion and characterized still further in that said portion of said valve operating means carries the valve means for controlling said bucket vent opening.

In testimony whereof I hereby affix my signature.

LESLIE P. STRONG.